United States Patent [19]

Freeman

[11] Patent Number: 4,478,671

[45] Date of Patent: Oct. 23, 1984

[54] ROLLER-TYPE LIQUID-ADHESIVE APPLICATOR

[76] Inventor: James D. Freeman, 11 W. Grand Ct., Springfield, Ill. 62704

[21] Appl. No.: 475,733

[22] Filed: Mar. 16, 1983

[51] Int. Cl.[3] ........................ B65C 11/04; B32B 31/00; B44D 3/28; B43M 11/02

[52] U.S. Cl. .................................... 156/391; 156/578; 156/579; 118/711; 222/490; 222/549; 401/197; 401/220

[58] Field of Search ................................ 156/578-579, 156/391-392, 328, 548; 401/197, 208, 219, 220; 118/711; 222/549, 490

[56] References Cited

U.S. PATENT DOCUMENTS

| | | | |
|---|---|---|---|
| 2,605,487 | 8/1952 | Bugg | 401/197 |
| 2,605,488 | 8/1952 | Bugg | 401/197 |
| 3,712,748 | 1/1973 | Wilmans | 401/197 |
| 4,103,472 | 8/1978 | Heringer | 156/391 |
| 4,174,246 | 11/1979 | Ralston | 156/391 |
| 4,387,002 | 6/1983 | Knecht | 156/578 |

*Primary Examiner*—Michael Wityshyn
*Assistant Examiner*—Merrell C. Cashion
*Attorney, Agent, or Firm*—Ralph F. Staubly

[57] ABSTRACT

A liquid-adhesive applicator has a hollow cylindrical reservoir formed of a somewhat flexible plastic material and closed at each end by rigid plastic end caps. A stiff but bendable rod axially rotatably supports the reservoir, and is bent to form the shank of a handle for the applicator. The reservoir has a plurality of pairs of slits parallel to the axis of the reservoir and angled inwardly midway between radial and tangential orientation. Molded-on protuberances between the pairs of slits cause the slits to open when the applicator is pressed against a surface, such as the edge of a two-by-four stud, to apply adhesive thereto. In a second species the cylindrical reservoir and the end caps are cemented, or are thermoplastically welded, together; and are further made into a sealed toroidal reservoir by an axial tube that prevents leakage if the reservoir unit is discarded for throw-away replacement by a new head unit.

8 Claims, 6 Drawing Figures

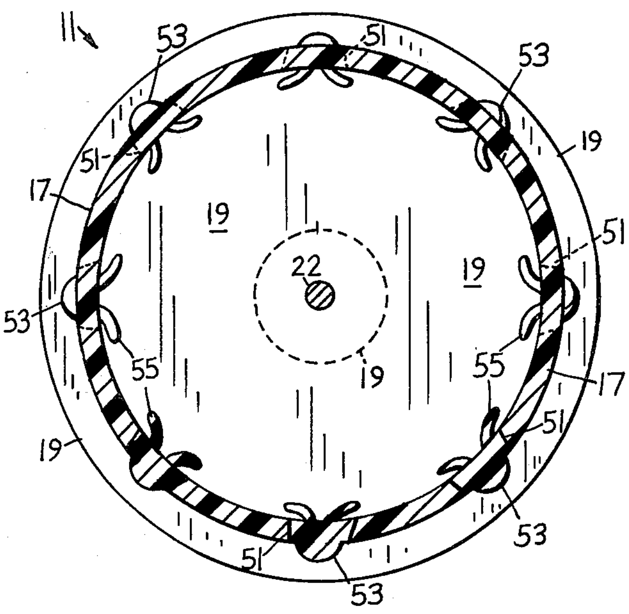
FIG. 2
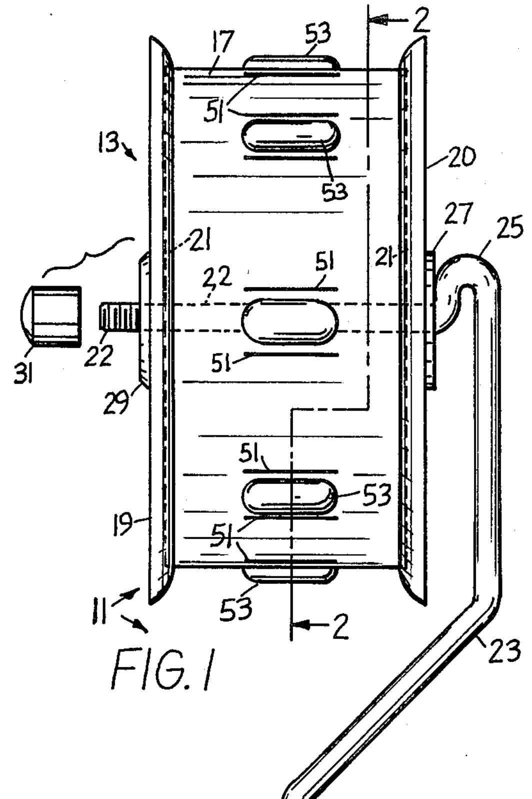
FIG. 1
FIG. 3
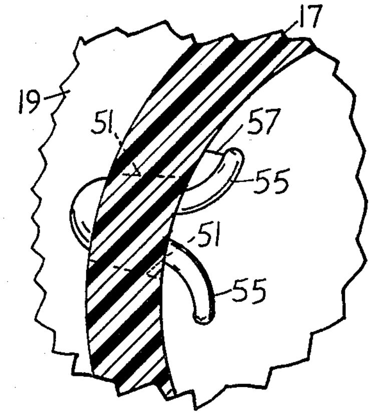
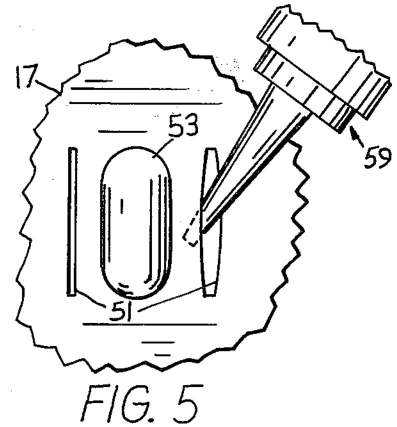
FIG. 5
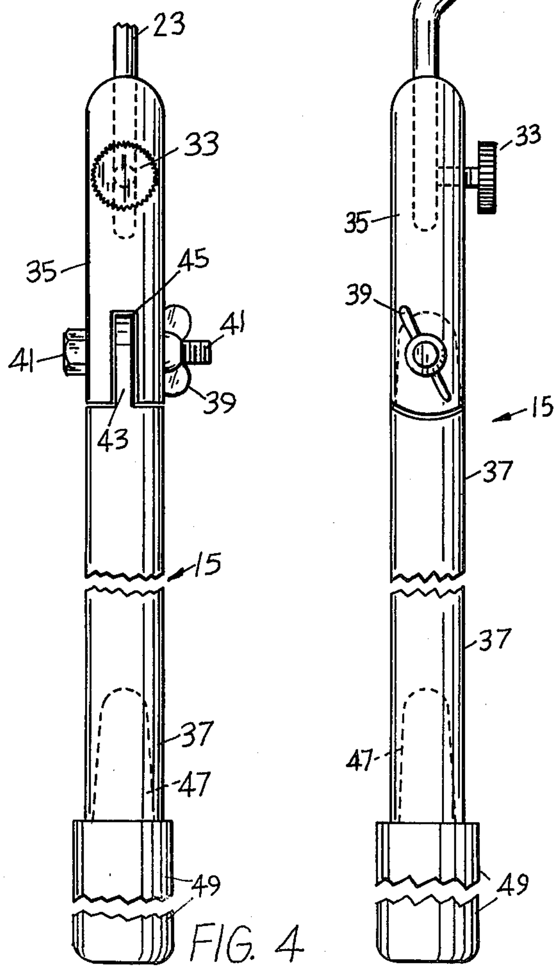
FIG. 4

ROLLER-TYPE LIQUID-ADHESIVE APPLICATOR

BACKGROUND OF THE INVENTION

Roller-type applicators for paints are well-known, and some are so designed that a hollow-roller serves as a reservoir for the paint that soaks through a porous roller during use. But no roller is known for applying adhesive (1) in which its hollow cylindrical body has normally closed longitudinally extending adhesive-dispensing slits that are opened by work-surface-pressed protuberances, and/or (2) in which the roller has radially flanged caps to guide the roller along the edge surface of a two-by-four lumber piece. It is the principal object of this invention to provide such an adhesive applicator.

BRIEF DESCRIPTIONS OF THE DRAWING FIGURES

FIG. 1 is a rear elevational view of a preferred embodiment of the invention.

FIG. 2 is a side elevational view of the head portion of the applicator in section on line 2—2 of FIG. 1.

FIG. 3 is an enlarged fragmentary view of the left central portion of FIG. 2.

FIG. 4 is an elevational view of the handle portion as seen from the right side of FIG. 1.

FIG. 5 is a fragmentary plan view showing how the reservoir can be filled from a syringe-type container.

DETAILED DESCRIPTION

Figure 6:
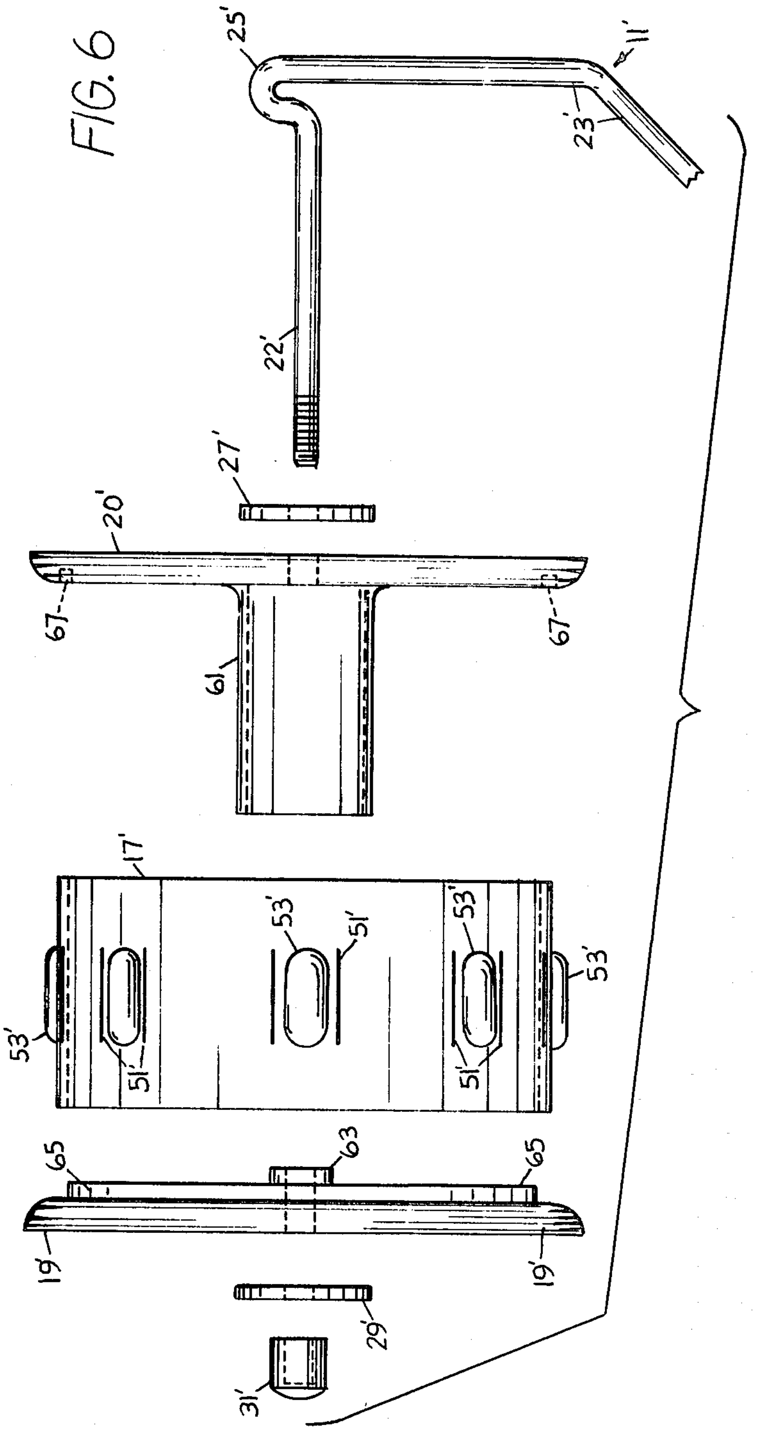
FIG. 6 is an exploded rear elevational view of a second (throw-away) species of the head unit.

With reference now to the drawings, the numeral 11 generally designates the adhesive-applicator, which basically comprises a head 13 and a handle 15.

The head 13 comprises a hollow cylindrical body 17 and a pair of relatively rigid plastic-material circular end caps 19 and 20. The caps 19 and 20 have shallow circular depressions 21 to receive and snugly embrace the rims of the hollow body 17, which body is formed of a somewhat flexible plastic material.

The head 13 is mounted on an axially disposed shaft 22 formed by the end of a stiff but bendable rod 23. The rod 23 constitutes a part of the handle 15 by being bent as shown in FIG. 1. It also provides at bend 25 an abutment for a washer-type gasket 27 that seals the right bearing of the head. A similar washer-gasket 29 seals the left bearing and is clamped against the end cap 19 by a cap-nut 31 on the threaded end of the shaft 22.

The lower end of the rod 23 is rotatably adjustably held by a set-screw 33 in an axial socket in the upper portion 35 of a handle grip 37. The parts 35 and 37 of the handle 15 are angularly adjustably connected by a wing-nut 39 and by a bolt 41 passing through a tongue 43 in a slot 45. The lower end of the handle grip 37 has an axial socket to frictionally grip a axial post 47 on the upper end of a handle extension 49 for increasing the reach of the applicator 11.

The hollow body 17 is provided with pairs of slits 51 parallel to the shaft 22 and oppositely angled approximately midway between radial and tangential orientation so that the portions of body 17 between said pairs of slits can be gapingly pressed inwardly by molded-on protuberances 53 when the applicator is pressed against a surface to be adhesive-coated, e.g. the edge of a two-by-four lumber piece against which dry-wall panels can be thus adhered. For such use, the end caps 19 and 20 will be guidingly spaced by the body 17 slightly more than the thickness of a two-by-four stud.

Molded ribs 55 form trough-shaped pockets beside the slits 51 to better hold adhesive material 57 (FIG. 3) adjacent said slits.

FIG. 5 shows how the body 17 can be filled with adhesive material by syringe-type container 59.

In the species of FIG. 6, primed numerals designate parts corresponding to the parts indicated by not-primed numerals in the species of FIGS. 1–3. The principal differences embodied in FIG. 6 are a hollow post 61 molded axially to the end cap 20′ and engageable over short post 63 molded on the end cap 19′; and an annular rib 65 molded on the end cap 19′ to fit snugly within the left rim of the cylindrical body 17′. A further difference is an annular groove 67 molded into the end cap 20′ to receive the right rim of the cylindrical body 17′. The parts 19′, 20′ and 17′ optionally can be cemented or thermoplastically welded together by the added elements 61, 63, 65 and 67 to provide a throw-away replaceable unit.

The invention having been described, what is claimed is:

1. A roller-type liquid-adhesive applicator, comprising: a hollow cylindrical somewhat flexible plastic adhesive-holding reservoir member having a plurality of closely adjacent pairs of normally self-closing slits parallel to the axis of said reservoir member and oppositely inwardly angled roughly midway between radial and tangential orientation; end caps for said reservoir member; handle means for holding and axially rotatably manipulating said applicator; and axially elongated mound-shaped protuberances equally circumferentially spaced on the surface of said reservoir member for the adhesive-dispensing opening of said slits when said applicator is pressed against a surface to be adhesive-coated.

2. An applicator according to claim 1 wherein said protuberances are positioned parallel to and between said pairs of oppositely angled slits.

3. An applicator according to claim 2 wherein there are oppositely angled trough-shaped pockets adjacent said pairs of slits to enhance flow of adhesive toward said slits.

4. An applicator according to claim 1 wherein said end caps have diameters greater than said reservoir member to define flanges for guiding said applicator along the surface of a body slightly narrower than the space between said flanges.

5. An applicator according to claim 4 wherein said surface is the edge of a two-by-four lumber piece.

6. An applicator according to claim 1 wherein said reservoir member is a molded plastic-material body.

7. An applicator according to claim 1 wherein said hollow cylindrical reservoir and said end caps are permanently interconnected to provide a throw-away-type replaceable unit.

8. An applicator according to claim 7 wherein a hollow axial post seals the central portion of said reservoir to prevent spillage of any adhesive material that may remain therein at disposal of said replaceable unit.

* * * * *